Figure 1:
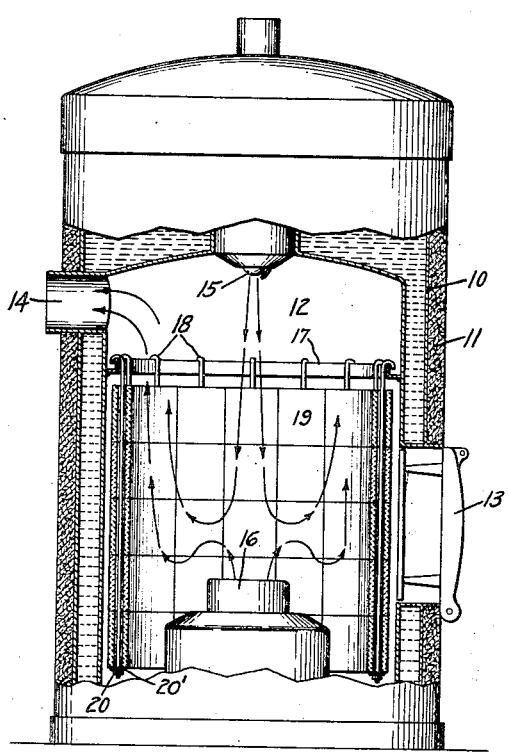

May 1, 1934.  A. MACCHI  1,957,220

REMOVABLE FURNACE REFRACTORY

Filed Dec. 31, 1930

Inventor:
Aldo Macchi,
by Charles E. Tullar
His Attorney.

Patented May 1, 1934

1,957,220

UNITED STATES PATENT OFFICE 1,957,220

REMOVABLE FURNACE REFRACTORY

Aldo Macchi, Schenectady, N. Y., assignor to General Electric Company, a corporation of New York Application December 31, 1930, Serial No. 505,866

8 Claims. (Cl. 110—1)

My invention relates to improvements in refractory material used to line and protect surfaces exposed to intense heat, such for example as the walls of the combustion chamber of a furnace.

Although my invention is applicable to any surface exposed to intense heat it is particularly adaptable to oil burners making use of a vertical flame in the combustion chamber.

Oil burners usually have had the refractory material while plastic cemented to the inside of the combustion chamber. Due to the fact that no provision is usually made for expansion and contraction in response to the variation of temperature within the combustion chamber due to the fact that present methods for making this provision are too involved and expensive, cracking of the refractory material is a common occurrence after a period of service. This requires repairing or replacement which consumes considerable time and is a rather awkward procedure since it is necessary to work through a small opening in the combustion chamber.

In the usual oil burner the refractory and flame are not so related as to produce maximum efficiency in producing combustion. The flame as a rule is directed against some portion of the refractory which is heated more than other parts of the refractory which not only causes stresses in the refractory but does not assist in even combustion of the oil flame.

Hence it is the principal object of my invention to provide an improved form of refractory material which may be easily mounted within a combustion chamber as a unit and which may be readily replaced if damaged during service.

It is another object of my invention to provide a refractory of the above type which provides for expansion and contraction during combustion conditions.

It is a further object of my invention to heat insulate the oil burner flame inside the combustion chamber to promote complete combustion thereof.

Other objects will appear hereinafter.

In the preferred embodiment of my invention the combustion chamber has attached to the walls thereof a support in the form of a ledge providing a vertical ridge. Attached thereto are units of refractory material consisting of a rod with a curved end for engaging the ridge of the supporting device and having strung thereon a plurality of similarly shaped refractory bricks loosely mounted upon the rod and held thereon by means of a washer and screw engaging the other end of the rod. These units can be inserted through the door to the combustion chamber and suspended from the supporting device in contact with each other. When so hung the series of strung refractory bricks suspended from the supporting device form a lining of refractory material for protecting the walls of the combustion chamber.

Figure 2:
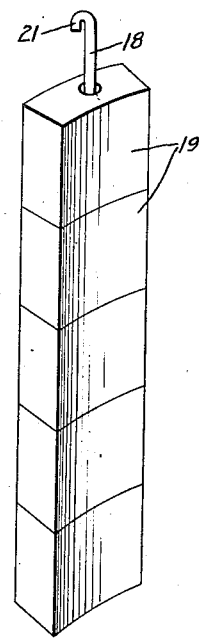

Referring to the drawing, Fig. 1 shows a cross section of an oil burner furnace with my invention therein. Fig. 2 is a detailed showing of one of the units making up the refractory lining.

Referring to the drawing, the furnace 10 is covered with a suitable heat insulating material 11. Mounted within the furnace and surrounded by water is the combustion chamber 12 which is provided with a door 13 and a flue 14. A downwardly directed flame is projected into the furnace by means of the nozzle 15. An air nozzle 16 mounted at the bottom of the combustion chamber helps in the combustion of the oil flame. The downward flame and the upwardly directed stream of air are indicated by the arrows. It is, of course, understood that my refractory is also adaptable to other forms of combustion chambers making use of powdered fuel, gases or solid fuel. Mounted near the top of the combustion chamber and attached to the walls thereof is the bracket support 17. Suspended thereon in sliding engagement are the rods 18 provided with the curved ends 21 which detachably engage the bracket, which rods have strung thereon the refractory bricks 19, 19, 19 maintained on the rod by means of the nut 20 and the washer 20'. This material can be easily inserted through the door 13 as units and hung upon the supporting bracket 17 in engagement with each other so as to provide a solid lining as shown in Fig. 1, and spaced from the walls of said combustion chamber.

It will be noted that the refractory protects the walls of the combustion chamber from the direct heat of the flame. The refractory lining also acts as a heat insulator for the flame and becomes intensely hot, the heat being evenly distributed throughout, the working temperature of the combustion chamber being dependent upon the ratio of the thickness of the bricks to their heat conductivity. This intense heat makes possible substantially complete combustion of all the fuel sprayed into the combustion chamber. Further, this arrangement prevents contact of the flame with the water backed wall of the combustion chamber, thus preventing the flame from being chilled by the walls and thus again preventing incomplete combustion of the oil flame.

It will thus be seen that I have provided a unique and simple method of lining a combustion chamber with refractory material, the bricks being supported so that longitudinal and lateral contraction and expansion thereof can take place due to temperature changes without causing undue stress and strain in any part of the refractory thus preventing fracture or cracking. The refractory can easily be replaced when necessary by removing the particular unit with the damaged refractory and replacing it with a new unit, or simply replacing the damaged brick in its particular unit. Further, with this type of refractory an entire refractory lining can be shipped to distant points without fear of breakage, the lining being quickly assembled at the point of installation.

The embodiment of the invention illustrated and described herein has been selected for the purpose of clearly setting forth the principles involved. It will be apparent, however, that the invention is susceptible of being modified to meet the different conditions encountered in its use, and I, therefore, aim to cover by the appended claims all of the modifications within the true spirit and scope of my invention.

What I claim as new and desire to secure by Letters Patent of the United States is:

1. In combination, a cylindrical combustion chamber, a supporting ring mounted adjacent the wall of the chamber at the top part thereof, detachable rods hanging freely from said supporting ring in spaced relation with said wall, a plurality of segmentally shaped refractory bricks attached to each rod and supported in contacting relationship with the bricks supported by other rods on either side thereof, whereby said bricks form a detachable cylindrical lining for the wall of said combustion chamber.

2. In combination, a furnace having a combustion chamber, a supporting ledge extending from a wall of said combustion chamber, refractory supporting rods hanging freely from said ledge, and a plurality of refractory bricks strung on each of said rods, said rods being placed on said ledge with said bricks adjacent each other and in contacting relationship to form a refractory lining to protect the wall of said combustion chamber and for permitting longitudinal and lateral expansion of each of said bricks.

3. In a combustion chamber, a support disposed in spaced relation with a wall of said combustion chamber, a refractory lining unit for the wall of said combustion chamber including a rod hanging freely from the support, and a plurality of refractory bricks strung on the rod and fastening means at the free end of the rod for supporting the bricks.

4. In a combustion chamber, a lining supporting element spaced from a wall thereof, a refractory lining unit for said combustion chamber, including a rod having an end for freely hanging said rod from the supporting element in detachable relationship therewith, said rod having disposed thereon and being supported thereby in contacting relationship a plurality of refractory bricks, said rod supporting said bricks in spaced relation with the wall of the combustion chamber.

5. In combination, a furnace having a combustion chamber, a lining supporting bracket extending from a wall thereof, a refractory unit for said combustion chamber including a rod having a hooked end for freely hanging said rod from the supporting bracket, a plurality of refractory bricks strung on said rod in contacting relationship, said rod suspending said bricks in spaced relation with the wall of the combustion chamber, and a fastening element on the free end of said rod for maintaining said bricks thereon.

6. In a water backed combustion chamber, a supporting bracket extending from a wall of said combustion chamber, a plurality of detachable rods hanging freely on said bracket in spaced relation with the wall of said combustion chamber and slidably adjustable on said bracket, and each rod having a plurality of refractory bricks supported thereon to form the lining for said combustion chamber.

7. In combination, an oil burner furnace having a combustion chamber, a supporting bracket attached to a wall of said combustion chamber, said bracket being provided with an upwardly directed supporting ridge spaced from the wall of said combustion chamber, a plurality of refractory units hanging from said ridge in spaced relation with said wall and forming a refractory lining for said combustion chamber, each of said units comprising a rod having an end for detachably hanging said rod from said supporting ridge in sliding engagement therewith for adjustment thereon, and a plurality of refractory bricks strung on said rod in contacting relationship whereby a rod with its refractory bricks may be instantly removed as a unit.

8. In an oil burner furnace having a combustion chamber, a supporting bracket attached to a wall of the combustion chamber and provided with an upwardly directed ridge spaced from the wall of said combustion chamber, a plurality of refractory units hanging freely from said ridge in spaced relation with said wall for forming a self-aligning refractory lining for the wall of said combustion chamber, each of said refractory units comprising a rod having a hooked end for detachable hanging said rod on said supporting ridge in sliding engagement therewith for adjustment thereon, and a plurality of refractory bricks disposed on said rod in contacting relationship, and means for maintaining said bricks on said rod, said refractory units being instantly removable.

ALDO MACCHI.